June 18, 1929.  M. J. MICKULECKY  1,718,058
CLUTCH OR BRAKE CONSTRUCTION
Filed Jan. 20, 1927  3 Sheets-Sheet 1

June 18, 1929.  M. J. MICKULECKY  1,718,058
CLUTCH OR BRAKE CONSTRUCTION
Filed Jan. 20, 1927   3 Sheets-Sheet 2
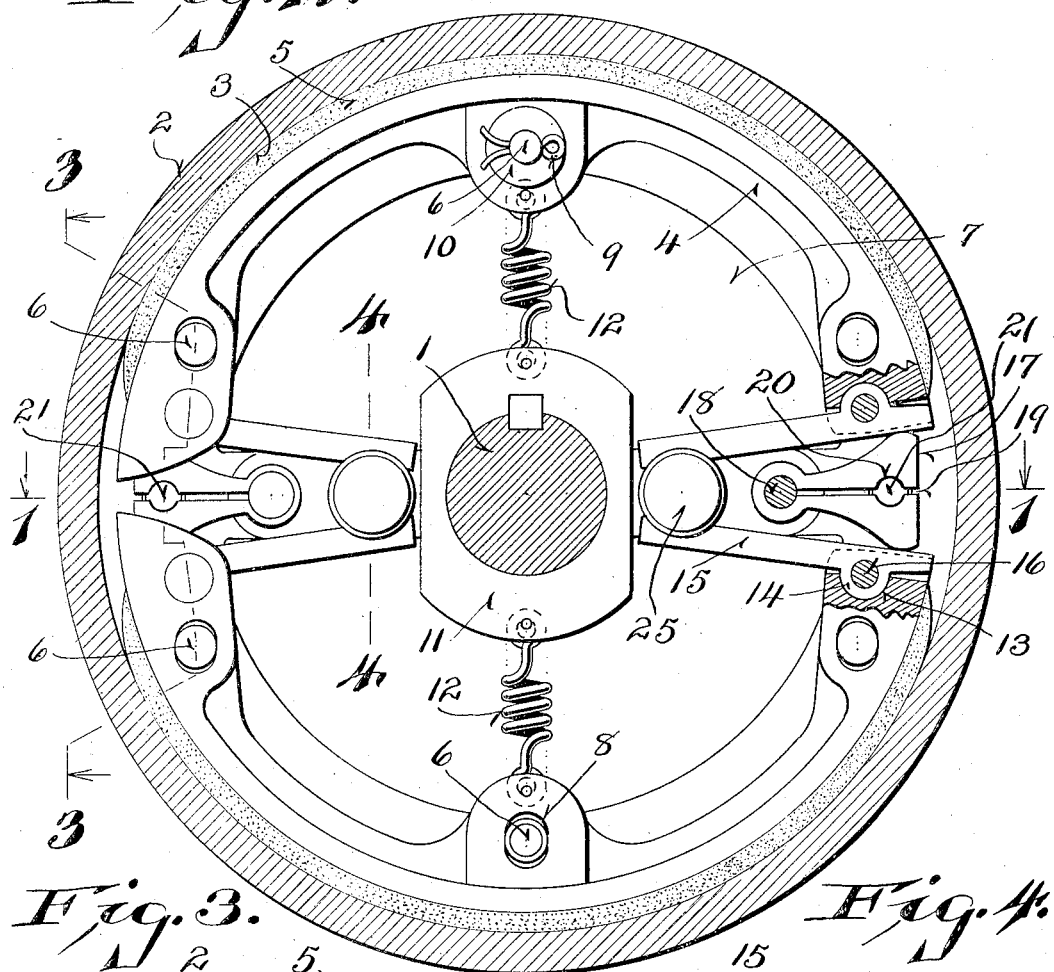
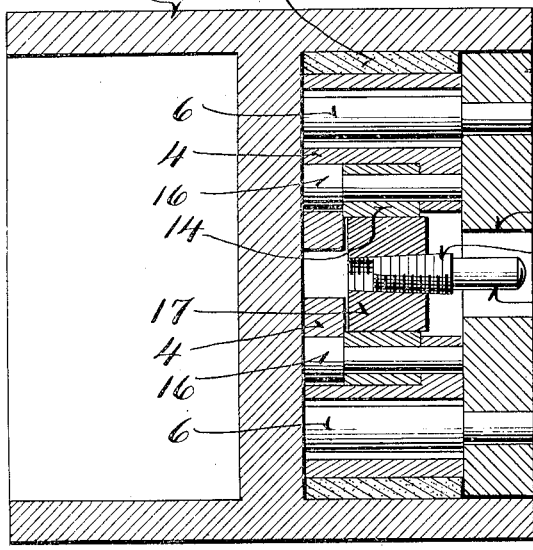
Inventor
Mark J. Mickulecky
By
Attorneys

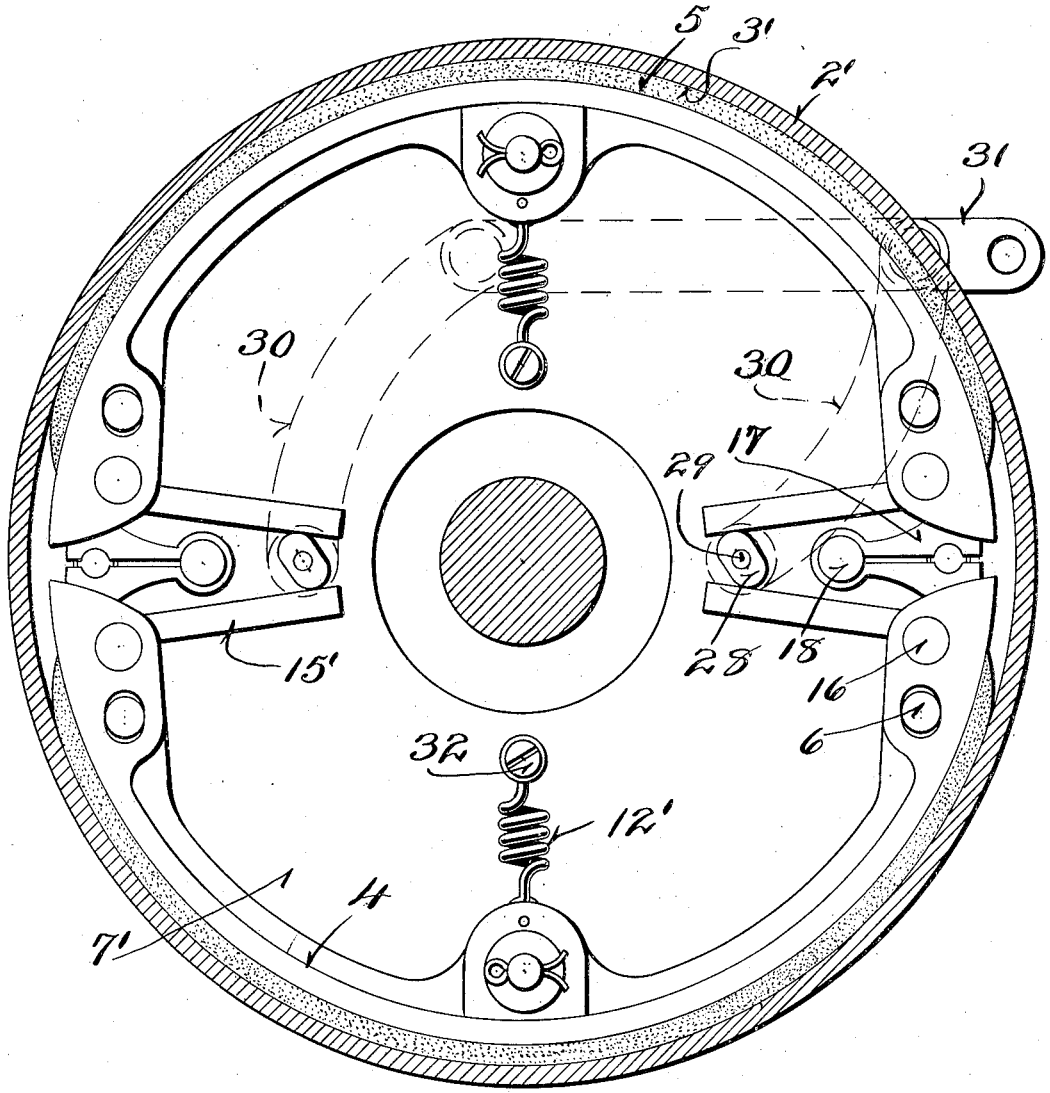

Patented June 18, 1929.

1,718,058

UNITED STATES PATENT OFFICE.

MARK J. MICKULECKY, OF RACINE, WISCONSIN.

CLUTCH OR BRAKE CONSTRUCTION.

Application filed January 20, 1927. Serial No. 162,321.

This invention relates to clutch and brake constructions.

Objects of this invention are to provide a novel form of construction which is particularly applicable either to clutches or to brakes, and is so constructed that a revoluble member is gripped by semi-circular shoes in a way to cause all portions of the friction surface of the shoes to engage the corresponding cylindrical friction surface of the revoluble member.

Further objects are to provide a construction in which means are provided for adjusting the friction shoes to take up for wear, such means being accessible from the exterior of the device and being adapted for adjustment in a very simple and easy manner without in any way dismantling the apparatus.

Further objects are to provide a novel form of construction for brakes or clutches which is so formed that it may be readily assembled or dismantled for renewal and which may be cheaply produced.

Embodiments of the invention are shown in the accompanying drawings in which:

Figure 2 is a transverse sectional view through the clutch, such view being taken on the line 2—2 of Figure 1;

Figure 3 is an enlarged sectional view on the line 3—3 of Figure 2;

Figure 4 is a sectional view on the line 4—4 of Figure 2;

Figure 5 is a view corresponding to Figure 2 showing the device applied to brakes.

Figure 1:
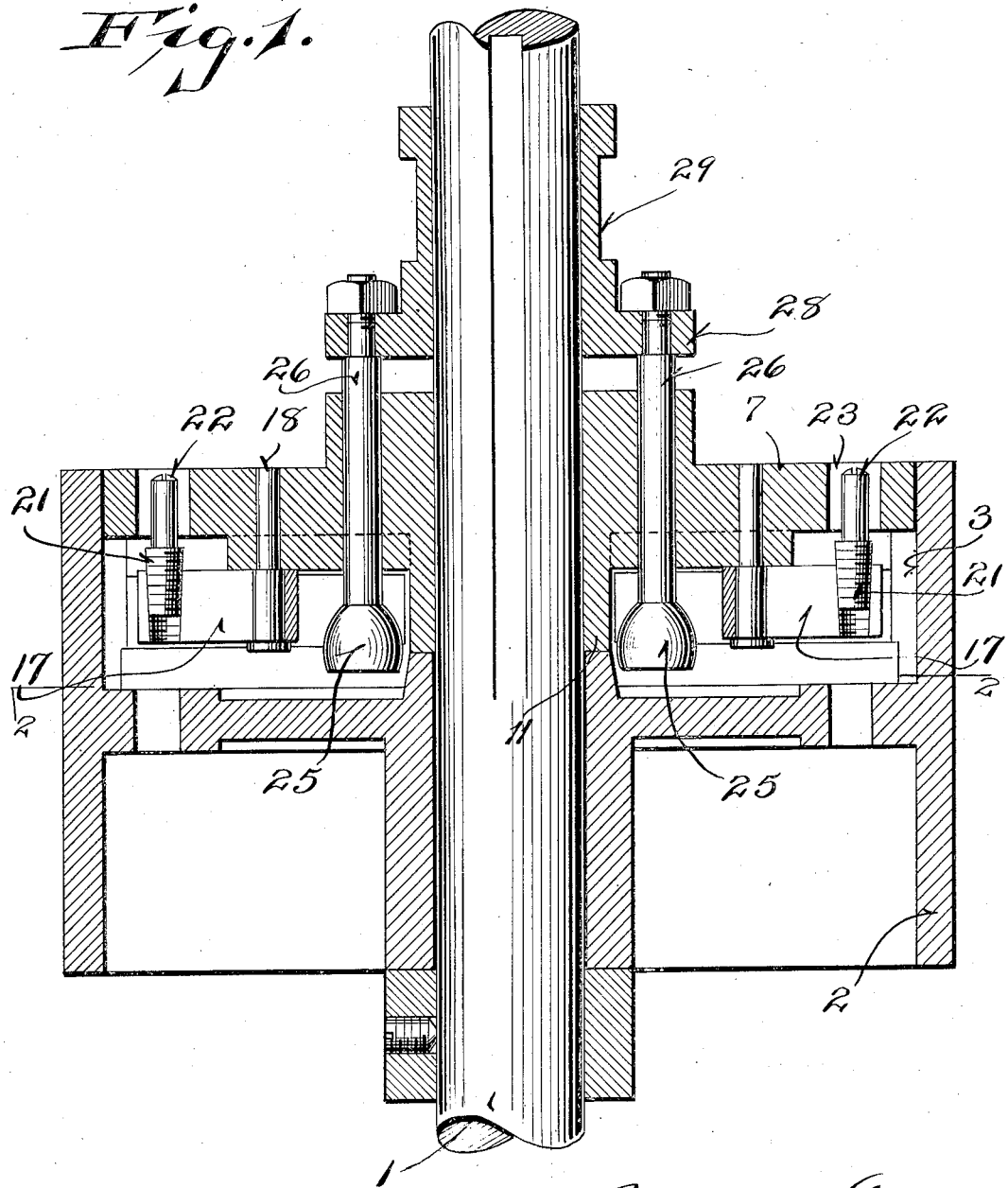
Figure 1 is a sectional view through the clutch, such view corresponding to a section on the line 1—1 of Figure 2.

Referring to Figures 1 to 4, it will be seen that the clutch comprises a shaft 1 upon which is revolubly mounted a driving member 2, such, for example, as a pulley, although obviously other driving members could be used. This member is provided with a cylindrical interior friction surface 3 adapted to be engaged by the friction shoes 4 (see Figure 2). These friction shoes are, of course, provided with a friction lining 5 of any suitable type and it will be noted that the shoes are approximately semi-circular, a slight space being left between the opposed ends of the shoes. These shoes are guided by means of pins 6 carried by a plate 7 which in the form shown in Figures 1 to 4 constitutes the driven member of the clutch, although obviously, it could be the driving member. This plate, as stated, is provided with the pins 6 which preferably are arranged in groups of threes, and the shoes 4 are slotted, as indicated at 8, so that they move directly outwardly when they are forced apart. It is to be noted that one or more of the pins may be provided with a transverse aperture through which a split pin 9 is passed for each of the shoes, such split pins holding a retaining washer 10 in place, as shown in the upper side of Figure 2. Obviously, the pins could be carried by the shoes and the slots provided in the plate without departing from the spirit of the invention. Further, it is to be noted that the shaft 1 is keyed to the hub 11 of the plate 7 and that a pair of springs 12 extend from the hub to lugs carried by the shoes 4 so as to tend to retract the shoes and move them inwardly from contact with the revoluble cylindrical member 2.

The ends of the shoes are provided with sockets 13 which receive the cylindrical projecting portions 14 of levers 15. These levers, it will be noted from Figure 2, are pivoted upon pins 16 coaxial with the cylindrical sockets 13, such pins being carried by the shoes 4. Further, it is to be noted that the levers are pivoted intermediate their ends, preferably close to their outer ends, so that they are provided with free outer and inner ends arranged in pairs and are opposed as may be seen from Figure 2.

Fulcrum members 17 are pivotally carried by pins 18 secured to the plate 7 and have projecting portions engaging the outer ends of the levers 15, as shown most clearly on the right hand side of Figure 2. These floating fulcrum members are provided with a slit or split 19 which extends from adjacent the pins 18 through the outer faces. Further, they are each provided with a tapped tapered hole 20 within which a tapered threaded adjusting screw 21 is screwed. This screw has a slotted shank 22 (see Figure 3) which projects through an aperture 23 formed in the plate 7. Thus, the fulcrum members are adjustable from the outer side of the plate 7 without dismantling the device. The adjustment either spreads or contracts the fulcrum members and, consequently, varies the angular setting of the levers 15 and accordingly takes up for wear.

The inner ends of the levers 15 are preferably provided with slightly rounded recesses 24, as may be seen from Figure 4. These recesses receive the reciprocatory cam members 25 carried by rods 26 which extend through guiding bearing members 27 formed on the plate 7. These rods are threaded at their outer ends and receive nuts by means of which they are clamped to the flange 28 of a member 29 slidably splined upon the shaft 1. Any suitable means, as for example, the usual forked lever may be employed for moving the member 29 axially along the shaft to accordingly shift the cam members 25.

When it is desired to close the clutch, it is merely necessary to move the member 29 outwardly. This draws the cams 25 inwardly between the inner ends of the levers 15 and causes the levers to rock about the pins 16 and bear against the fulcrum members 17, thus forcing the friction shoes apart and causing them to bind against the cylindrical surface 3 of the revoluble member. It is to be noted particularly that a very great leverage is secured by this construction and, consequently, a very high pressure can be easily exerted by the shoes upon the cylindrical friction surface 3.

It is to be noted particularly that all portions of the shoes bear against the surface 3 when the shoes are forced apart as the shoes are formed in two separate portions so that distortion is not necessary when the clutch is locked. Further than this, the shoes are accurately guided by the pins 6 of the plate 7 and the thrust from the driving member is transmitted directly from the shoes to the pins and from thence to the plate 7.

It is to be noted further that due to the symmetrical construction of the clutch that it is equally effective for either direction of rotation of the member 2.

It is well known that clutches require occasional adjustment when in constant use. In the present invention all that is necessary is to slightly rotate the expansion screws 21 (see Figure 3) which accordingly separates the parts of each of the fulcrum members a slight distance and takes up the wear.

Further, the fulcrum members are floating members, as they are pivotally mounted upon the plate 7 and, consequently, the shoes will accurately adjust themselves to the interior of the revoluble member.

It is to be noted further that the sockets 13 cooperate with the projections 14 of the levers 15 and thus relieve the pins 16 of a major part of the strain due to the action of these levers 15. Consequently, wear at this point is reduced to a minimum.

When the device is used as a brake substantially the same construction is follwed. The shoes 4 are operated in the same manner by means of levers 15'. The only difference, however, is that the plate 7' is stationary. For example, it may be the outer flange of the rear axle housing of an automobile, for instance, or may be a flange carried rigidly by the front spindle of an automobile. Preferably also the levers 15' are rocked outwardly by means of rocking members 28. These cam members are carried by the shafts 29 which project through the plate 7' and are rigidly attached to the arms 30 mounted externally of the plate. These arms 30 may be connected by means of a link 31 and such link can be controlled in any suitable manner.

It will be seen that a highly effective and powerful brake is provided by this construction and one in which wear may be taken up by adjusting the device in a simple manner externally of the plate and without dismantling the brake.

The springs 12' may be secured to lugs carried by the shoes 4 in the same manner as previously shown, and may have their inner ends secured to the plate 7' by means of screws 32, if desired, or in any other suitable manner. With a brake constructed as described above, it will be noted that an enormous leverage is secured and consequently a very high pressure may be exerted between the brake shoes and the brake drum with a minimum of effort on the part of the operator.

Further, it will be seen that the brake is extremely compact and readily lends itself to automobile construction, although obviously, it can be used in other capacities.

It will be seen further that the construction is such as to be equally applicable to either brakes or clutches, and further, is such that it may be readily produced by ordinary machine shop methods.

It is preferably to provide the aperture for the adjustment or take-up screw in the plate, as described and illustrated in detail, but it is to be distinctly understood that the drum may have the apertures for providing access to the screws, as shown, if so desired, although this construction is not as practical as the one illustrated.

Although the invention has been described in considerable detail, such description is intended as illustrative rather than limiting as the invention may be variously embodied and as the scope of such invention is to be determined as claimed.

I claim:

1. In a device of the class described, the combination of a revolubly mounted member having a cylindrical friction surface, a plate mounted adjacent said member, a pair of friction shoes carried by said plate for engaging said friction surface, said shoes having opposed ends, a floating fulcrum member carried by said plate adjacent said ends, levers pivoted to the ends of said friction shoes and bearing against said fulcrum member, a cam for rocking said levers, said fulcrum member being split, and a tapered threaded plug screwed into said split fulcrum member for expanding such member to take up for wear, said plug being carried solely by said floating fulcrum member.

2. In a device of the class described, the combination of a revolubly mounted member having a cylindrical friction surface, a plate mounted adjacent said member, a pair of friction shoes carried by said plate for engaging said friction surface, said shoes having opposed ends, a floating fulcrum member carried by said plate adjacent said ends, levers pivoted to the ends of said friction shoes and bearing against said fulcrum member, a cam for rocking said levers, said fulcrum member being split, and a tapered threaded plug screwed into said split fulcrum member for expanding such member to take up for wear, said plug being carried solely by said floating fulcrum member, said plug being accessible exteriorly of said plate.

3. A construction for clutches or brakes comprising a revolubly mounted drum having an interior cylindrical surface, a plate associated with said drum and having guiding means, a pair of approximately semi-circular friction shoes mounted within said drum and adapted to engage said surface, said shoes being carried by said plate and guided by said guiding means and having opposed pairs of ends, a lever pivoted intermediate its ends to each of the ends of said shoes and arranged in opposed pairs having free outer and inner ends, a pair of fulcrum members pivoted to said plate and having outwardly extending ears bearing against the outer ends of said levers, said fulcrum members being split, a tapered expanding screw threaded into each fulcrum member, said plate having apertures adjacent each screw, whereby said screws are accessible from the exterior of said plate, and simultaneously operated cam members for separating the inner ends of said levers.

In testimony that I claim the foregoing I have hereunto set my hand at Racine, in the county of Racine and State of Wisconsin.

MARK J. MICKULECKY.